United States Patent
Pulsipher (10) Patent No.: US 10,273,995 B2
(45) Date of Patent: Apr. 30, 2019

(54) TARP CONNECTOR

(71) Applicant: David L. Pulsipher, Clinton, MI (US)

(72) Inventor: David L. Pulsipher, Clinton, MI (US)

( * ) Notice: Subject to any disclaimer, the term of this patent is extended or adjusted under 35 U.S.C. 154(b) by 242 days.

(21) Appl. No.: 15/223,457

(22) Filed: Jul. 29, 2016

(65) Prior Publication Data

US 2017/0184142 A1 Jun. 29, 2017

Related U.S. Application Data (60) Provisional application No. 62/271,381, filed on Dec. 28, 2015.

(51) Int. Cl.
*F16B 5/06* (2006.01)
*F16B 21/08* (2006.01)

(52) U.S. Cl.
CPC .......... *F16B 5/0692* (2013.01); *F16B 21/086* (2013.01)

(58) Field of Classification Search
CPC .... F16B 5/0692; A44B 13/007; G06F 1/1605; A45F 3/22
See application file for complete search history.

(56) References Cited

U.S. PATENT DOCUMENTS

| | | | |
|---|---|---|---|
| 1,426,237 A | 8/1922 | Witzberger | |
| 1,515,974 A | 11/1924 | Smith | |
| 2,788,047 A | 4/1957 | Rapata | |
| 2,956,605 A | 10/1960 | Rapata | |
| 3,092,175 A | 6/1963 | Suessle | |
| 3,213,500 A | 10/1965 | Thomson | |
| 3,756,115 A | 9/1973 | Schuplin | |
| 3,803,670 A | 4/1974 | Johnson | |
| 3,905,570 A | 9/1975 | Nieuwveld | |
| D257,950 S | 1/1981 | Van Meter, Jr. et al. | |
| D293,205 S | 12/1987 | Nakano | |
| 4,878,792 A | 11/1989 | Frano | |
| 5,222,988 A | 6/1993 | Riley | |
| 5,388,311 A | 2/1995 | Solbeck | |

(Continued)

OTHER PUBLICATIONS

Waterway Plastics, pool spa supplies, web page, http://www.pool-spa-supplies.com/waterway-plastics-snap-pin-base-fasteners-4-required-429-722, Jul. 28, 2016.

(Continued)

*Primary Examiner* — Jacob J Cigna
*Assistant Examiner* — Lee A Holly
(74) *Attorney, Agent, or Firm* — Young Basile Hanlon & MacFarlane, P.C.

(57) ABSTRACT

A connector is a unitary member having a male portion extending from a base. The male portion is configured as bifurcated snap pin to be inserted into and retain thereon a grommet of a tarpaulin. The base includes a central aperture configured to receive the threaded fastener, which extends through the central aperture in a direction opposite to the male portion. The base includes an inner flange extending radially between the central aperture and two male members forming the male portion, which is configured to receive a head of the threaded fastener thereagainst so as to compress the base between the fastener and the object. The base includes a central bore extending inward into the base from a surface opposite the male portion in the direction of the two male members. The central bore is configured to receive therein the male snap stud, so as to couple thereto.

19 Claims, 5 Drawing Sheets

(56) References Cited

U.S. PATENT DOCUMENTS

| | | |
|---|---|---|
| 5,547,322 A | 8/1996 | Lilja et al. |
| 5,580,203 A | 12/1996 | Read et al. |
| 5,706,559 A | 1/1998 | Oliver et al. |
| 5,881,989 A * | 3/1999 | O'Brien ............... G06F 1/1605 24/297 |
| D416,189 S | 11/1999 | Bollman |
| 6,086,306 A | 7/2000 | Bakker et al. |
| 6,301,113 B1 | 10/2001 | Guerrero |
| D451,789 S | 12/2001 | Hsieh |
| 6,634,843 B1 | 10/2003 | Tarnow et al. |
| 7,073,230 B2 | 7/2006 | Boville |
| 7,496,993 B2 | 3/2009 | Kosidlo et al. |
| D592,255 S | 5/2009 | Tak |
| D602,770 S | 10/2009 | Fernandez |
| D648,210 S | 11/2011 | Reynoso |
| 8,122,572 B2 | 2/2012 | Waddell et al. |
| D664,027 S | 7/2012 | Vosika et al. |
| D675,906 S | 2/2013 | Erickson |
| D720,123 S | 12/2014 | Frydlewski |
| D722,492 S | 2/2015 | Ramsauer |
| D763,673 S | 8/2016 | Moreau et al. |
| D793,216 S | 8/2017 | Divers et al. |
| 2004/0091332 A1 | 5/2004 | Kuntze |
| 2006/0200954 A1* | 9/2006 | Chung ................. A44B 13/007 24/713.6 |
| 2008/0104805 A1 | 5/2008 | Cameron |
| 2013/0211467 A1* | 8/2013 | Dickinson .......... A61B 17/7034 606/328 |
| 2014/0345049 A1* | 11/2014 | Gash ........................ A45F 3/22 5/121 |
| 2017/0119108 A1 | 5/2017 | Schlick |

OTHER PUBLICATIONS

Essentra Components, snap lock pin SLP, web page, http://www.essentracomponents.co.za/snap-lock-pin-slp, Jul. 28, 2016.

* cited by examiner

TARP CONNECTOR

CROSS-REFERENCE TO RELATED APPLICATION(S)

This application claims priority to and the benefit of U.S. Provisional Application No. 62/271,381, filed on Dec. 28, 2015, the entire disclosure of which is hereby incorporated by reference.

BACKGROUND

Tarpaulins, or tarps, and other flexible fabric covers may be used in a wide variety of applications to cover various objects. It would be advantageous to provide a connector that is easily fixed to an object, thereby allowing the user to releasably attach the tarpaulin to the object.

SUMMARY

A connector is a unitary member having a male portion extending from a base. The male portion is configured as bifurcated snap pin to be inserted into and retain thereon a grommet of a tarpaulin. The male portion includes two elongated male members that are spaced apart and cooperatively form a shaft and a head of the male portion. The two elongated male members are formed integrally with the base and extend axially therefrom. The base is configured to couple to an object with a threaded fastener. The base includes a central aperture configured to receive the threaded fastener, which extends through the central aperture in a direction opposite to the male portion. The base includes an inner flange extending radially between the central aperture and two male members, which is configured to receive a head of the threaded fastener thereagainst so as to compress the base between the fastener and the object. The base may instead, or additionally, be configured to couple to the object with a male snap stud. The base includes a central bore extending inward into the base from a surface opposite the male portion in the direction of the two male members. The central bore is configured to receive therein the male snap stud, so as to couple thereto. The central bore may additionally include an inner circumferential channel in which a snap ring is positioned, which receives the male snap stud therein. The base may be configured include both the central aperture and the central bore, such that a user may couple the connector to the object selectively with either the fastener or the male snap stud.

According to an exemplary embodiment, a connector is provided for releasably connecting a tarpaulin to an object. The connector includes a base and a pair of elongated members. The base includes a central aperture, an inner flange, and an outer flange. The base is configured to receive a threaded fastener with a shaft of the threaded fastener extending through the central aperture and a head of the threaded fastener engaging the inner flange. The pair of elongated members extend from and are integrally formed with the base. Each male member includes a shoulder and is resiliently flexible relative to the base to cooperatively form a shaft that is insertable into a grommet to retain the grommet between the shoulder and the outer flange.

According to another embodiment, a connector system includes a threaded fastener and a connector. The threaded fastener includes a head and a threaded shaft extending axially away from the head. The connector includes a base and a male portion integrally formed with the base and extending axially therefrom in a first direction. The threaded fastener is receivable by the connector to attach the connector to an object with the threaded shaft extending axially away from the base opposite the first direction. The male portion is resiliently compressible in a radial direction to be inserted into a grommet of a tarpaulin to releasably attach the connector to the tarpaulin.

According to another embodiment, a method is provided for connecting a tarpaulin to an object. A tarpaulin is provided that includes a plurality of grommets having an inner diameter that is one of approximately ½ inch or 12 mm. A connector is provided that includes a base and a male portion integrally formed with the base. The male portion includes a plurality of elongated members that extend independently from the base and that are resiliently compressible in a radial direction toward each other. The base includes a central aperture, an inner flange extending radially from the central aperture to the elongated members, and an outer flange. A threaded fastener is provided that includes a head and a threaded shaft extending from the head. The threaded shaft is through the aperture in a direction opposite the male portion. The threaded fastener is screwed into an object at a desired location until the inner flange is compressed between the object and the head of the fastener. One of the grommets is placed over the male portion causing the male portion to first radially compress and then radially expand to retain the grommet on the connector.

BRIEF DESCRIPTION OF THE DRAWINGS

The description herein makes reference to the accompanying drawings, wherein like referenced numerals refer to like parts throughout several views, and wherein.

DETAILED DESCRIPTION

A connector 1 is a continuous (e.g., unitary) member or structure having a male portion 10 extending away from a base portion 20. The male portion 10 is generally configured as a snap pin to be inserted into a grommet 110 (e.g., eyelet) of a tarpaulin 100 (e.g., tarp or cover), while the base 20 is configured to be coupled to another object (e.g., tree, log, building or other structure, boat, etc.). The connector 1 may, for example, be a plastic, injection molded component. According to other embodiments, the connector 1 may be made with other materials (e.g., other resilient polymers, composites, etc.), according other manufacturing methods or combinations thereof (e.g., molding, machining, 3D printing, etc.), or as a multi-piece component.

Figure 1:
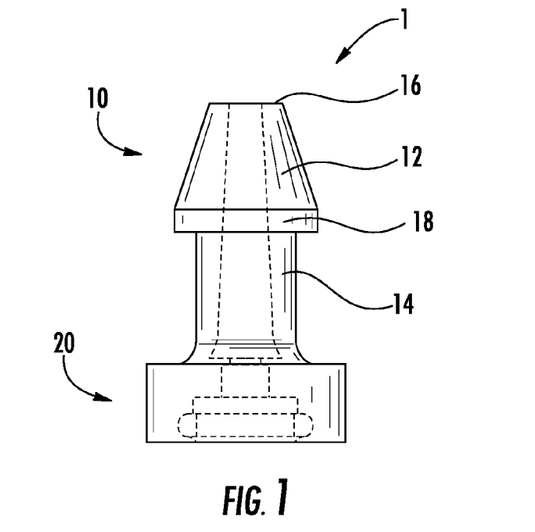
FIG. 1 is a front elevation view of a tarp connector according to an exemplary embodiment.

The male portion 10 generally includes or forms a head 12 (e.g., end) and a shaft 14 (e.g., shank) extending between the base 20 and the head 12 (see FIG. 1). More specifically, the male portion 10 includes two male members 10a that are separated by a gap 11 (e.g., slot; see FIG. 2). The gap 11 extends from the base 20 to ends of the two male members 10a, such that the male members 10a extend independently of each other from the base 20. The male members 10a each include a head portion 12a (e.g., head segment or region) and a shaft portion 14a (e.g., shaft or shank region or segment) extending from the base 20 to the head portion 12a. The head portions 12a and the shaft portions 14a of the two male members 10a cooperatively define the head 12 and the shaft 14 of the male portion 10 of the connector 1. When inserted into the grommet 110, the male members 10a are bent elastically radially inward so as to at least partially close the gap 11, and once the head portions 12a move past the grommet 110, the male members 10a relax to their original position with the grommet 110 surrounding the shaft portions 14a with the head portions 12a retaining the grommet 110 thereon. Thus, the male portion 10 is radially compressible to receive the grommet 110 thereon and, thereafter, radially expands to retain the grommet 110 to the connector 1.

To facilitate receipt and retention of the grommet on the male portion 10 of the connector 1, the head 12 tapers or widens from an end 16 of the connector 1 opposite the base 20 to a shoulder 18 (e.g., flange, shelf, barb, etc.) positioned adjacent the shaft 14. The end 16 has a nominal diameter or other maximum dimension (e.g., maximum width between ends 16a of the two male members 10a in a relaxed state) that is less than the diameter or other inner dimension of an aperture of the grommet 110 of the tarp 100 (e.g., approximately ½ inch or, alternatively, 12 mm for conventional, off-the-shelf tarps 100) to facilitate initial insertion into the grommet 110. The shoulder 18 has a maximum compressed width (e.g., maximum width between shoulder portions 18a of the two male members 10a when compressed or squeezed to close the gap 11, or across a single shoulder portion 18) that is less than that of the grommet 110 to allow passage through the grommet 110, and a nominal diameter or other maximum dimension (e.g., maximum width between shoulder portions 18a of the two male members 10a when relaxed) that is larger than that of the grommet 110 to retain the grommet 110 on the shaft 14. The shaft 14 has a nominal diameter or other maximum dimension (e.g., maximum width between shaft portions 14a of the two male members 10a in a relaxed state) that is less than the aperture diameter (e.g. inner diameter) of the grommet 110.

For example, the diameter of the end 16 may be between 0.05" and 0.20" less than the aperture diameter of the grommet 110 for conventional off-the-shelf tarps 100, such as between approximately 0.30" and 0.45" (preferably between 0.40" and 0.425" for grommets 110 of conventional, off-the-shelf tarps 100). The nominal diameter of the shoulder 18 may be between approximately 0.05" and 0.20" (preferably between 0.10" and 0.125") greater than the aperture diameter of the grommet 110, such as between approximately 0.55" and 0.70" (preferably between 0.60" and 0.625"). The gap 11 preferably has a width that is greater than the difference between the nominal diameter of the shoulder 18 and the aperture diameter of the grommet 110 (e.g., between 0.15" and 0.45", or preferably between 0.29" and 0.32" 16 at the end). Furthermore, the gap 11 may narrow moving from the end 16 to the base 20. The shaft 14 has a nominal diameter that is between 0.02" and 0.10" (preferably between 0.035" and 0.05") less than the aperture diameter, such as between approximately 0.48" and 0.40" (preferably between 0.465" and 0.45"). According to other exemplary embodiments, the end 16, shoulder 18, and shaft 14 may have other dimensions relative to the grommet 110 or in absolute measures (e.g., smaller or larger) configured to allow receipt and retention of the grommet 110 on the male portion 10 of the connector 1.

The shaft 14 has a length between the shoulder 18 and the base 20 that is greater than the width (e.g., thickness) of at least one conventional grommet 110 of the tarp 100. The length of the shaft 14 may be longer than the width of the grommet 110, so as to additionally receive and retain thereon a second grommet 110. The male portion 10 may have a length of between approximately ¾ and 1¼ inch (e.g., approximately one inch) measured from the base 20 of which the shaft 14 has a length of between approximately ¼ and ¾ inch (e.g., approximately ½ inch), or other suitable lengths. The connector 1 may have an overall length of approximately one and 1½ inches (e.g., approximately 1¼ inch) formed by the male portion 10 and the base 20. The base 20 is substantially planar and may have a constant length (e.g., thickness) of between approximately ⅛ and ½ inch (e.g., approximately ¼ inch), or other suitable length.

The length of the shaft 14 may also allow for a retaining member 40 (e.g., a C-clip) to be positioned around the shaft 14 between the grommet 110 and the shoulder 18. The retaining member 40 facilitates retention of the grommet 110 on the shaft, for example, by having a surface profile and dimensions complementary to the shoulder 18. For example, the C-clip may have a surface angle matching that of the axially facing surface of the shoulder 18 that intersects the shaft 14 (e.g., approximately 90 degrees relative to the axis of the shaft 14). The C-clip may also have an inner diameter that is approximately equal the nominal diameter of the shaft 14 (or less, so as to compress the shaft 14), such that the C-clip may be aligned with and bear against substantially the entire axially facing surface of the shoulder 18. Use of the retaining member 40 may be particularly advantageous for grommets 110 that have a tapered or rounded profile that may radially compress the head portions 12a toward each other when the tarp 100 is pulled relative to the connector 1, which may cause unintended release of the grommet 110 from the connector 1. The retaining member 40 may be used, or provided, with the connector 1 as a connector system. C-clip may be used, or provided, with the connector 1 as a system.

Figure 5:
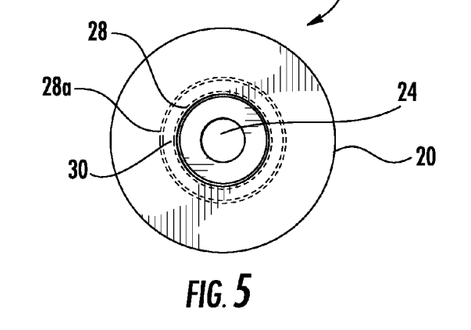
FIG. 5 is a bottom plan view of the tarp connector shown in FIG. 2.
Figure 6:
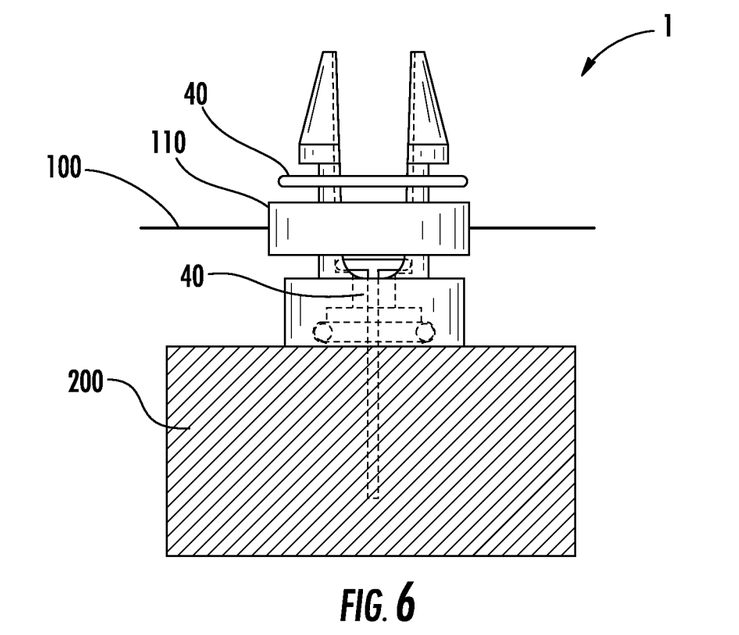
FIG. 6 is a front elevation view of the tarp connector of FIG. 1 shown coupled to a tarp and an object with a fastener.
Figure 7:
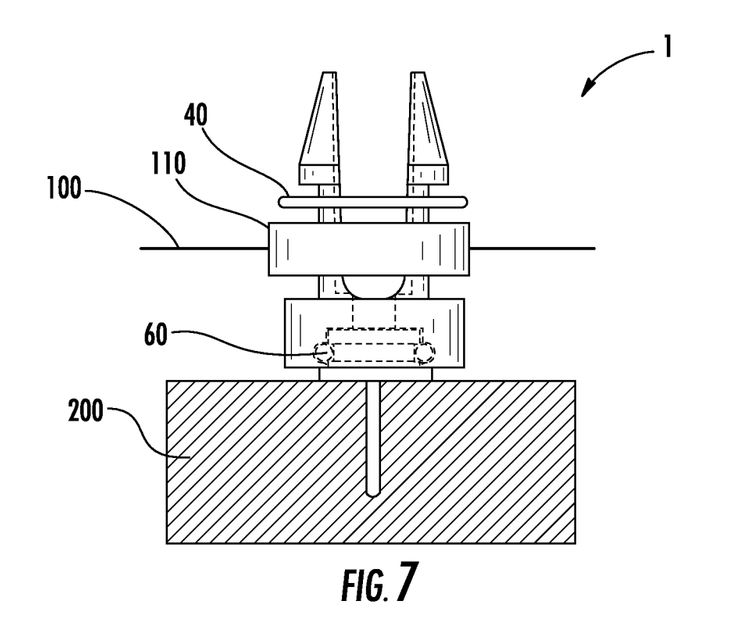
FIG. 7 is a front elevation view of the tarp connector of FIG. 1 shown coupled to a tarp and an object with a snap stud.
Figure 8:
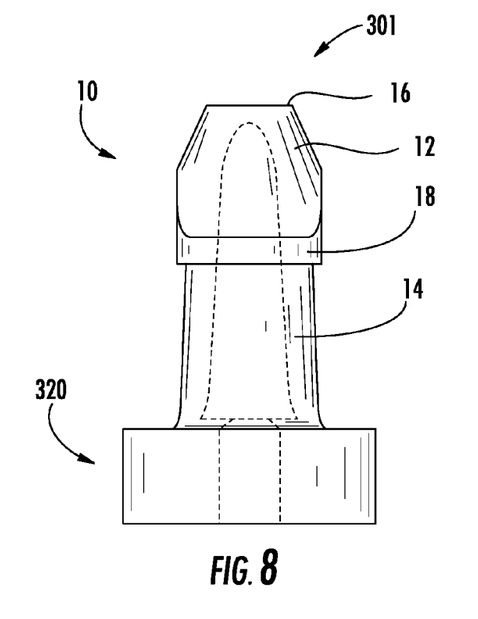
FIG. 8 is a front elevation view of a tarp connector according to another embodiment.
Figure 9:
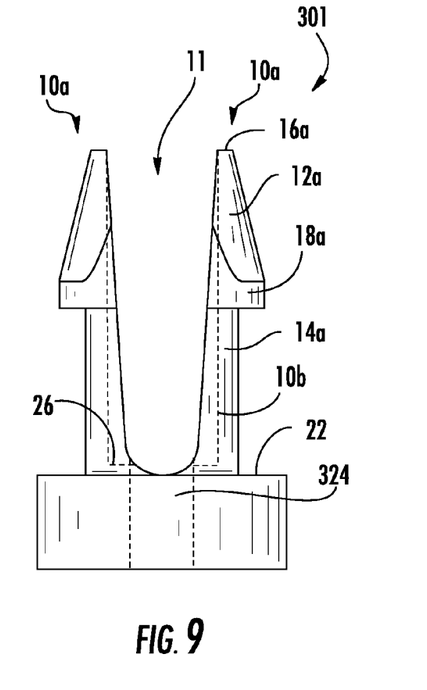
FIG. 9 is a side elevation view of the tarp connector shown in FIG. 8.
Figures 10, 11, 12:
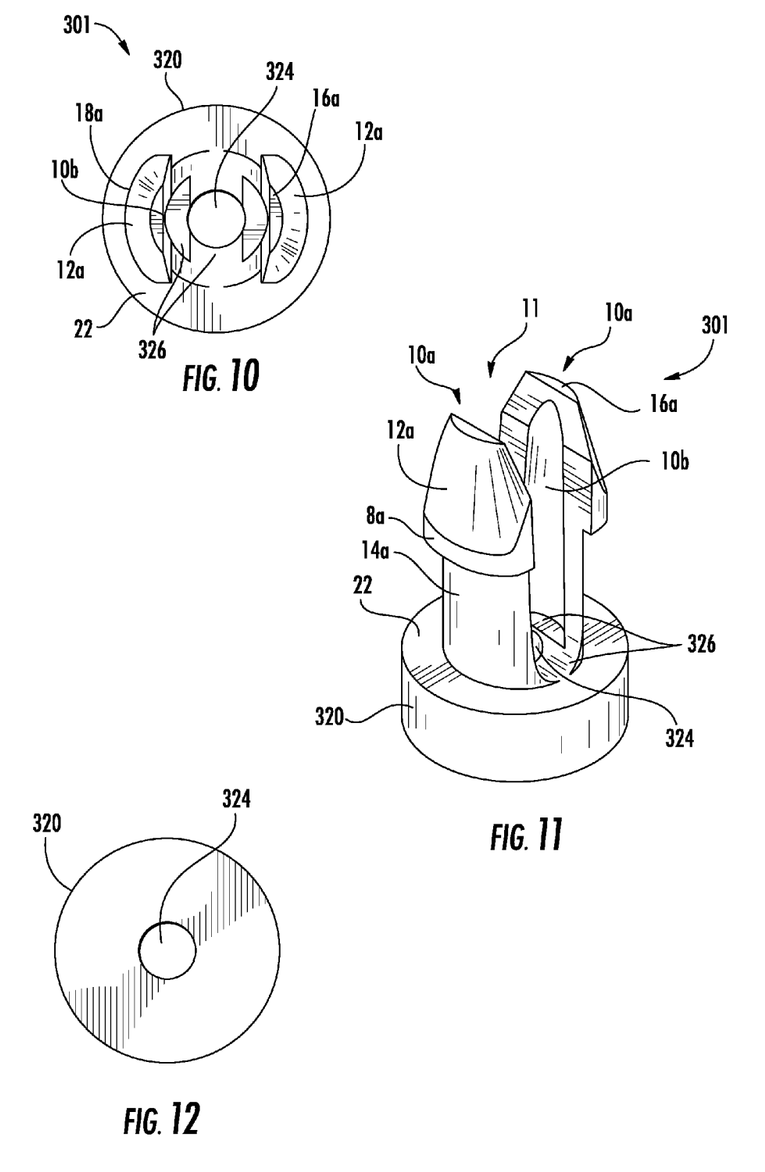
FIG. 10 is a top plan view of the tarp connector shown in FIG. 8.
FIG. 11 is a perspective view of the tarp connector shown in FIG. 8.
FIG. 12 is a bottom plan view of the tarp connector shown in FIG. 8.

The base 20 forms a generally cylindrical body and is configured to be coupled to another object 200, for example, with a conventional threaded fastener 50 (e.g., wood screws; FIG. 5), a snap stud 60 (FIG. 6), or both to thereby allow a user to choose whether to couple connector 1 to the object 200 with the conventional threaded fastener 50 or the snap stud 60. The connector 1 and the fastener 50 and/or snap stud 60 therefore form a connector system that may also include the tarpaulin 100. The base 20 forms an outer flange 22 extending radially outward from the shaft 14 against which the grommet 110 may engage. The outer flange 22 has an outer diameter that is larger than an inner diameter of the grommet 110 to provide a surface that engages and retains the grommet 110 on the connector 1. For example, the outer flange 22 may have an outer diameter that is between approximately 1.25 and two times the inner diameter of the grommet 110, such as approximately 1.5 times (e.g., between approximately ⅝ and one inch, or approximately ¾ inch).

To allow coupling of the connector 1 to the object 200 with conventional fasteners 50 (e.g., wood or drywall screws), the base 20 may include a central aperture 24 concentrically aligned with the axis of the shaft 14 and being configured to receive the fastener therethrough. The fastener 50 extends through the aperture 24 generally in the axial direction opposite the male portion 10 and into the object 200. The central aperture 24 has a diameter that is less than a distance between the male members 10a measured across the aperture 24, such that the base 20 forms an inner flange 26. The inner flange 26 is configured to receive a head of the fastener 50 thereagainst, so as to compress the base 20 between the head of the fastener 50 and the object 200 into which the fastener 50 is inserted. The radially outer peripheries of the central aperture 24 and the inner flange 26 are depicted in broken lines in FIGS. 1-2.

Figure 3:
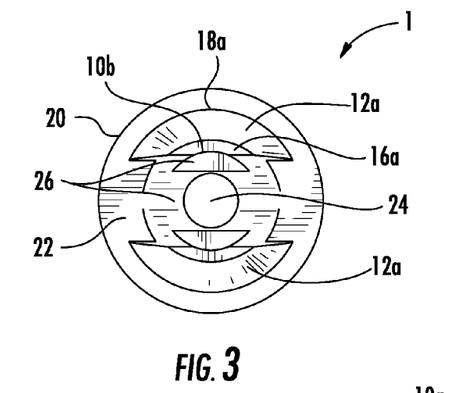
FIG. 3 is a top plan view of the tarp connector shown in FIG. 1.
Figure 4:
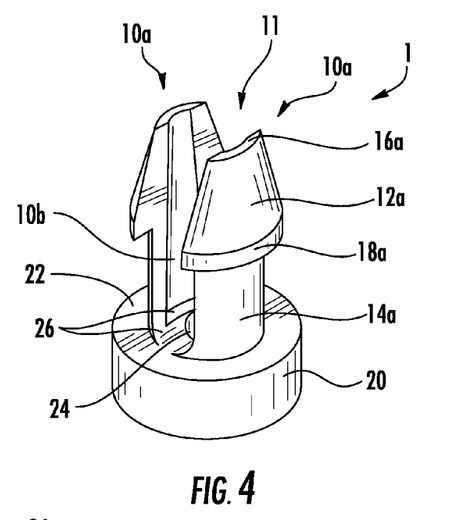
FIG. 4 is a perspective view of the tarp connector shown in FIG. 1.

The inner flange 26 may, for example, have an outer diameter (e.g., between approximately 0.25 inches and 0.5 inches, such as approximately 0.3 inches) that is between approximately 1.25 and three times (e.g., between approximately 1.5 and three times) the diameter of the central aperture 24 (e.g., between approximately 0.1 inches and 0.3 inches, such as between 0.175 and 0.2 inches). Additionally, portions of the inner flange 26 (e.g., those aligned with the gap 11) may be positioned at substantially the same axial position (e.g., height) as the outer flange 22. Other portions of the inner flange 26 may slope or taper upward (axially) and outward (radially) from the aperture 24 to radially inner surfaces 10b of the male members 10a (see, e.g., crescent-shaped portions of the inner flanges 26 shown in FIG. 3).

Figure 2:
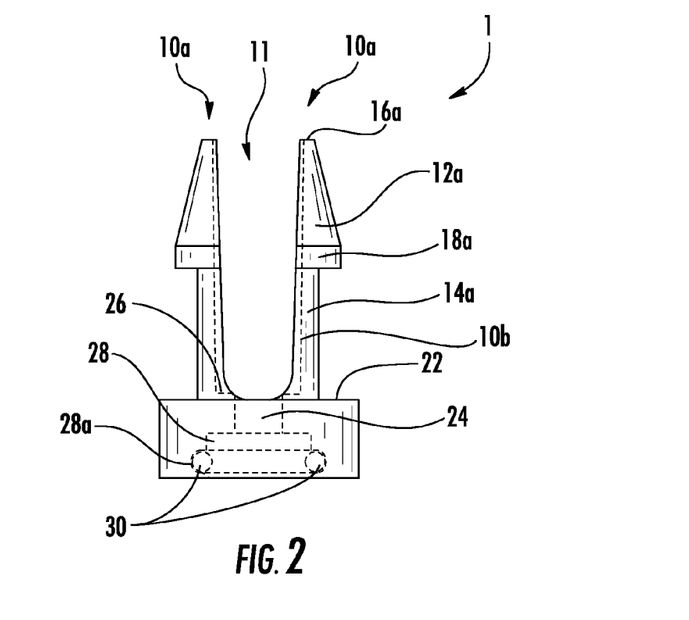
FIG. 2 is a side elevation view of the tarp connector shown in FIG. 1.

Still further, radially inner surfaces 10b (represented by broken lines in FIGS. 1-2) of the male members 10a may each have a concave profile. The concave profiles allow receipt of the fastener 50, including its head, between the male members 10a, as well as a fastening tool (e.g., screw driver or bit). For example, the concave profiles may cooperatively define a cylinder (e.g., cylindrical bore) having a diameter approximately equal to the width or diameter of the inner flange 26 and/or the gap 11 at the end 16. As shown in the figures, the concave profile extends radially outward from the axis of the shaft 14 into the inner surfaces 10b of the male members 10a. Additionally, as shown in FIG. 2, the gap 11 between inner edges of the male members 10a may increase (e.g., taper or widen) moving from the base 20 toward the head 12. The recesses formed in the radially inner surfaces 10b can also vary in depth as measured from the inner edges of the male members 10a (e.g., decreasing in depth moving from the inner flange 26 to the head 12; see FIG. 2) and/or decrease in circumferential width as measured between the inner edges of the male members 10a (e.g., decreasing in circumferential width moving from the flange inner flange 26 to the head 12; see FIG. 1). The widening gap 11 in combination with the decreasing depths and/or circumferential widths of the recesses in the radially inner surfaces 10b of the male members 10a can define the cylindrical bore extending from the head 12 to the inner flange 26.

To allow coupling of the connector 1 to the object 200 with a snap stud 60, the base 20 may include a central bore 28 positioned opposite the shaft 14 and the outer flange 22. The central bore 28 is generally circular and is concentric with the axis of the shaft 14 with a diameter sufficient to receive a conventional snap stud 60 (i.e., the male member of a snap coupling or assembly; not shown). The central bore 28 forms a recess within the base 20 but does not extend entirely through the base 20. In embodiments also having the central aperture 24 for a threaded fastener 50, the central bore 28 has a larger diameter than the central aperture 24 and is in communication with the central aperture, thereby allowing the fastener 50 to extend through the bore 28. The base 20 may additionally include a snap ring 30 (e.g., a spring steel or other metal ring) that is inserted within an inner circumferential channel 28a of the central bore 28, and that is configured to receive and engage therein the snap stud 60 (e.g., the snap stud 60 having a threaded shaft coupled thereto to be inserted into the object). Being positioned and retained within the inner circumferential channel 28a in the base 20, the snap ring 30 thereby couples the connector 1 to the snap stud 60. According to another exemplary embodiment, the bore 28 is configured for the base 20 to directly engage and/or couple to the snap stud 60.

The connector 1 may also be used in a method for coupling a tarp 100 to an object 200. In a first step, the connector 1 is coupled to the object selectively by a user with one of a threaded fastener 50 or a snap stud 60. In a second step, the male portion 10 is inserted into the grommet 110 of the tarp 100.

As shown in FIGS. 8-12, a connector 301 is configured substantially similar to the connector 1 but omits features allowing the connector 301 to be coupled to a snap stud. Rather, the base has a central aperture 324 with a constant diameter that extends through a base 320 from an inner flange 326 to a bottom of the base 320.

While this disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A connector for releasably connecting a tarpaulin to an object, the connector comprising:
    a base having a central aperture, an inner flange, and an outer flange, wherein the base is configured to receive a threaded fastener with a shaft of the threaded fastener extending through the central aperture and a head of the threaded fastener engaging the inner flange;
    a pair of elongated members extending from and integrally formed with the base, each elongated member having a shoulder and being resiliently flexible relative to the base to cooperatively form a shaft that is insertable into a grommet to retain the grommet between the shoulder and the outer flange;
    wherein the base is further configured to receive and couple to a head of a snap stud at a side of the base opposite the elongated members, the base including a snap ring for engaging the head of the snap stud.

2. The connector according to claim 1, wherein the inner flange is arranged between the elongated members.

3. The connector according to claim 2, wherein a portion of the inner flange is slopes to receive a tapered head of the threaded fastener thereagainst.

4. The connector according to claim 3, wherein the inner flange slopes from the central aperture axially toward ends of the elongated member and radially toward inner surfaces of the elongated members.

5. The connector according to claim 2, wherein the pair of elongated members cooperatively define a cylindrical bore extending from the inner flange to ends of the elongated members, the cylindrical bore and the inner flange having the same diameter.

6. The connector according to claim 1, wherein the pair of elongated members are spaced apart by a gap that extends from the base to ends of the elongated members.

7. The connector according to claim 6, wherein the pair of elongated members cooperatively define a cylindrical bore that is coaxial with the central aperture, and the gap widens moving axially away from the base.

8. The connector according to claim 7, wherein each elongated member has a radially inner surface that defines a recess having a depth measured relative to inner edges of the elongated member, the depth decreasing moving axially away from the base.

9. The connector according to claim 7, wherein each elongated member has a radially inner surface that defines a recess having a circumferential width measured between inner edges of the elongated member, the circumferential width decreasing moving axially away from the base.

10. The connector according to claim 1, wherein the shaft has an outer shaft diameter that is substantially constant and less than ½ inch, the shoulder has an outer shoulder diameter that is greater than ½ inch, and the outer flange has an outer flange diameter that is greater than the outer shoulder diameter.

11. The connector according to claim 10, wherein the shaft has a shaft length measured in an axial direction and greater than approximately ¼ inch.

12. The connector according to claim 11, wherein the shaft length is sufficient for the shaft to receive two or more grommets of one or more tarpaulins between the outer flange and the shoulder.

13. A connector system comprising:
a threaded fastener comprising a head and a threaded shaft extending axially away from the head; and
a connector comprising base and a male portion integrally formed with the base and extending axially therefrom in a first direction;
wherein the threaded fastener is receivable by the connector to attach the connector to an object with the threaded shaft extending axially away from the base opposite the first direction;
wherein the base is configured to receive and couple to a head of a snap stud at a side of the base opposite the male portion, the base including a snap ring for engaging the head of the snap stud; and
wherein the male portion is resiliently compressible in a radial direction to be inserted into a grommet of a tarpaulin to removably attach the connector to the tarpaulin.

14. The connector system according to claim 13, wherein the base includes a central aperture, an inner flange extending radially between the central aperture and inner surfaces of elongated members that form the male portion, and an outer flange extending radially outward from the elongated members;
wherein the threaded shaft is receivable through the central aperture with the head positioned against the inner flange, and the grommet is receivable over the elongated members to engage the outer flange.

15. The connector system according to claim 14, wherein each elongated member extends from the base and includes a shaft portion adjacent the base and a head portion adjacent the shaft portion and distal from the base, wherein the heads portions cooperatively define a head of the male portion having an outer diameter that is greater than an inner grommet diameter of the grommet.

16. The connector system according to claim 15, wherein the shaft portions cooperatively define a shaft of the male portion having a diameter that is less than the inner grommet diameter and having a length that is greater than two times a thickness of the grommet of the tarpaulin.

17. The connector system according to claim 14, wherein the elongated members are spaced apart to be resiliently compressible toward each other, and cooperatively define a cylindrical bore that is coaxial with the central aperture.

18. The connector system according to claim 13, further comprising the tarpaulin.

19. A method for connecting a tarpaulin to an object, the method comprising:
providing a tarpaulin having a plurality of grommets having an inner diameter that is one of approximately ½ inch or 12 mm;
providing a connector having a base and a male portion integrally formed with the base, wherein male portion includes a plurality of elongated members that extend independently from the base and are resiliently compressible in a radial direction toward each other, wherein the base includes a central aperture, an inner flange extending radially from the central aperture to the elongated members, and an outer flange extending radially outward from the elongated members, and wherein the base is further configured to receive and couple to a head of a snap stud at a side of the base opposite the elongated members, the base including a snap ring for engaging the head of the snap stud;
providing a threaded fastener having a head and a threaded shaft extending from the head; and
inserting the threaded shaft through the aperture in a direction opposite the male portion;
screwing the threaded shaft into an on object at a desired location until the inner flange is compressed between the object and the head of the fastener; and
placing one of the grommets over the male portion causing the male portion to first radially compress and then radially expand to retain the grommet on the connector.

* * * * *